(12) United States Patent
Vanatalu

(10) Patent No.: US 12,462,100 B2
(45) Date of Patent: Nov. 4, 2025

(54) INTELLIGENT CLASSIFICATION OF TEXT-BASED CONTENT

(71) Applicant: Microsoft Technology Licensing, LLC, Redmond, WA (US)

(72) Inventor: Tonu Vanatalu, Tallinn (EE)

(73) Assignee: Microsoft Technology Licensing, LLC, Redmond, WA (US)

( * ) Notice: Subject to any disclaimer, the term of this patent is extended or adjusted under 35 U.S.C. 154(b) by 308 days.

(21) Appl. No.: 18/137,933

(22) Filed: Apr. 21, 2023

(65) Prior Publication Data
US 2024/0354500 A1   Oct. 24, 2024

(51) Int. Cl.
*G06F 40/205* (2020.01)
*G06N 20/00* (2019.01)

(52) U.S. Cl.
CPC ........... *G06F 40/205* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 7,209,954 B1 | 4/2007 | Rothwell et al. | |
| 7,756,535 B1 | 7/2010 | Diao et al. | |
| 10,200,329 B2 | 2/2019 | Zhong et al. | |
| 2003/0088627 A1 | 5/2003 | Rothwell et al. | |
| 2005/0251861 A1* | 11/2005 | Cunningham | H04L 63/12 726/23 |
| 2008/0195606 A1* | 8/2008 | Ren | G06F 16/38 707/999.005 |
| 2015/0254566 A1 | 9/2015 | Chandramouli et al. | |
| 2017/0372071 A1 | 12/2017 | Saxe | |

(Continued)

FOREIGN PATENT DOCUMENTS

| | | |
|---|---|---|
| CN | 105786792 A | 7/2016 |
| CN | 110019773 A | 7/2019 |

(Continued)

OTHER PUBLICATIONS

"UnicodeCategory Enum", Retrieved From: https://learn.microsoft.com/en-us/dotnet/api/system.globalization.unicodecategory?view=net-7.0, Retrieved Date: Mar. 6, 2023, 6 Pages.

(Continued)

*Primary Examiner* — Quynh H Nguyen
(74) *Attorney, Agent, or Firm* — Klarquist Sparkman, LLP

(57) ABSTRACT

Approaches to classifying text-based content are described herein. For example, a classification system performs operations that include receiving text-based content comprising a plurality of characters, generating a plurality of character category sequences using the plurality of characters and based on a plurality of predefined character categories, calculating a frequency distribution of the plurality of character category sequences, and classifying the text-based content based on the calculated frequency distribution. The classifying uses a machine learning model that has been trained using a plurality of examples of text-based content. Responsive to the classification, the system can take appropriate actions. For example, responsive to classifying the text-based content as unsolicited, the system can restrict distribution of the text-based content or generate an alert for the text-based content.

20 Claims, 11 Drawing Sheets

(56) References Cited

U.S. PATENT DOCUMENTS

| | | | | |
|---|---|---|---|---|
| 2019/0103091 A1* | 4/2019 | Chen | .................. | G06N 3/08 |
| 2020/0152295 A1* | 5/2020 | Gibson | .................. | G06F 17/16 |
| 2021/0248457 A1* | 8/2021 | Odibat | .................. | G06N 3/045 |

FOREIGN PATENT DOCUMENTS

| | | |
|---|---|---|
| JP | 2011008388 A | 1/2011 |
| KR | 101426616 B1 | 8/2014 |

OTHER PUBLICATIONS

Liu, et al., "Fighting Unicode-Obfuscated Spam", In Proceedings of the Anti-Phishing Working Groups 2nd Annual eCrime Researchers Summit, Oct. 4, 2007, 16 Pages.

Whistler, Ken, "Unicode Character Categories", In Technical Report of Unicode #49, Oct. 27, 2010, 7 Pages.

Luong Hieu Thi's Blog, "Unicode Character Categories and the CJK Ideograph Complications," 7 pages, Jul. 22, 2021.

Wikipedia, "Dimensionality Reduction," https://en.wikipedia.org/wiki/Dimensionality_reduction, 7 pages (accessed Mar. 24, 2023).

Brownlee, "Introduction to Dimensionality Reduction for Machine Learning," Machine Learning Mastery, 17 pages, May 6, 2020.

Hosni, "9 Dimensionality Reduction Methods You Should Know in 2023," MLearning.ai, https://medium.com/mlearning-ai/practical-guide-to-dimensionality-reduction-in-python-9da6c84ad8ee, 63 pages, Sep. 24, 2022.

Salekshahrezaee et al., "A Reconstruction Error-Based Framework for Label Noise Detection," Journal of Big Data, 16 pages, 8:57, 2021.

Wikipedia, "t-distributed stochastic neighbor embedding," https://en.wikipedia.org/wiki/T-distributed_stochastic_neighbor_embedding, 4 pages (accessed Mar. 29, 2023).

Wikipedia, "Autoencoder," 14 pages, https://en.wikipedia.org/wiki/Autoencoder (accessed Mar. 29, 2023).

"Unicode Character Property—Wikipedia," Retrieved from the Internet: URL: - https://en.wikipedia.org/w/index.phptitle=Unicode_character_property&oldid=1114571327, Oct. 7, 2022, 39 Pages.

Grendar, et al., "Spam filtering by quantitative profiles," Retrieved from the Internet: URL: https://arxiv.org/pdf/1201.0040, Dec. 23, 2011, 07 Pages.

International Search Report and Written Opinion received for PCT Application No. PCT/US2024/023500, (MS# 412968- PCT01) Jul. 29, 2024, 12 pages.

Spitalsky, et al., "OPTICS-based clustering of emails represented by quantitative profiles," Distributed Computing and Artificial Intelligence: 10th International Conference, Jan. 1, 2013, 08 Pages.

Whistler, Ken, "UTN #36—A Categorization of Unicode Characters," Retrieved from the Internet: URL: -https:/ www.unicode.org/notes/tn36/, Nov. 8, 2011, 07 Pages.

* cited by examiner

FIG. 3

| Category | ID | Note |
|---|---|---|
| UppercaseLetter | 0 | Uppercase letter. Signified by the Unicode designation "Lu" (letter, uppercase). |
| LowercaseLetter | 1 | Lowercase letter. Signified by the Unicode designation "Ll" (letter, lowercase). |
| TitlecaseLetter | 2 | Titlecase letter. Signified by the Unicode designation "Lt" (letter, titlecase). |
| ModifierLetter | 3 | Modifier letter character, which is free-standing spacing character that indicates modifications of a preceding letter. Signified by the Unicode designation "Lm" (letter, modifier). |
| OtherLetter | 4 | Letter that is not an uppercase letter, a lowercase letter, a titlecase letter, or a modifier letter. Signified by the Unicode designation "Lo" (letter, other). |
| NonSpacingMark | 5 | Nonspacing character that indicates modifications of a base character. Signified by the Unicode designation "Mn" (mark, nonspacing). |
| SpacingCombiningMark | 6 | Spacing character that indicates modifications of a base character and affects the width of the glyph for that base character. Signified by the Unicode designation "Mc" (mark, spacing combining). |
| EnclosingMark | 7 | Enclosing mark character, which is a nonspacing combining character that surrounds all previous characters up to and including a base character. Signified by the Unicode designation "Me" (mark, enclosing). |
| DecimalDigitNumber | 8 | Decimal digit character, that is, a character representing an integer in the range 0 through 9. Signified by the Unicode designation "Nd" (number, decimal digit). |
| LetterNumber | 9 | Number represented by a letter, instead of a decimal digit, for example, the Roman numeral for five, which is "V". The indicator is signified by the Unicode designation "Nl" (number, letter). |
| ... | ... | ... |

300

```
public static IEnumerable<((UnicodeCategory First,UnicodeCategory Second),double)> BuildGraph(string text)
{
    Dictionary<(UnicodeCategory, UnicodeCategory), int> sequences = new Dictionary<(UnicodeCategory, UnicodeCategory), int>();

(UnicodeCategory First, UnicodeCategory Second) key;
    key.First = char.GetUnicodeCategory(text.First());

foreach (char c in text.Skip(1))
    {
        key.Second = char.GetUnicodeCategory(c);
        if (sequences.ContainsKey(key)) {
            sequences[key]++;
        } else {
            sequences[key] = 1;
        }
        key.First = key.Second;
    } return sequences.OrderByDescending(element => element.Value).
        Select(element => (element.Key, (double)element.Value / (double)(text.Length - 1)));
}
```

INTELLIGENT CLASSIFICATION OF TEXT-BASED CONTENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In the era of Internet and online communication, unsolicited text-based content (e.g., text-based messages) are ubiquitous. Certain types of text-based content (e.g., unsolicited emails, unsolicited SMS text messages, etc.) are undesired, sometimes fraudulent content, typically sent by bulk, that the receiver did not ask or expect to receive. Unsolicited text-based content are not only a nuisance that can clog up recipients' inboxes, but also can be malicious and pose security threats to recipients' computing devices and/or networks. Although various approaches have been developed to detect and filter unsolicited text-based content, there still exists ample opportunity for improvement in detection technologies for unsolicited text-based content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Certain aspects of the disclosure concern one or more computer-readable media having encoded thereon computer-executable instructions that cause one or more processors to perform a method of classifying text-based content. The method can receive text-based content comprising a plurality of characters, generate a plurality of character category sequences for the text-based content using the plurality of characters. Each character category sequence, among the plurality of character category sequences, comprises multiple character category identifiers for multiple characters, respectively, of a different character sequence in the text-based content. Each character category identifier, among the multiple character category identifiers, identifies one of a plurality of predefined character categories. The method can calculate a frequency distribution of the plurality of character category sequences, and classify the text-based content based on the calculated frequency distribution of the plurality of character category sequences. The frequency distribution represents relative frequencies of occurrence of unique character category sequences among a total number of the plurality of character category sequences. The dimension of input to the machine learning model is reduced as compared with input based on a frequency distribution of character sequences for the text-based content, which can reduce computational complexity and reduce memory utilization for the classification operation, without adversely affecting the accuracy of the result of the classification.

Certain aspects of the disclosure also concern a computing device including memory, one or more hardware processors coupled to the memory, and one or more computer readable storage media storing instructions that, when loaded into the memory, cause the one or more hardware processors to perform operations for classifying text-based content. The operations can include receiving text-based content comprising a plurality of characters, generating a plurality of character category sequences for the text-based content using the plurality of characters. Each character category sequence, among the plurality of character category sequences, comprises multiple character category identifiers for multiple characters, respectively, of a different character sequence in the text-based content. Each character category identifier, among the multiple character category identifiers, identifies one of a plurality of predefined character categories. The operations also include calculating a frequency distribution of the plurality of character category sequences, and classifying the text-based content based on the calculated frequency distribution of the plurality of character category sequences. The frequency distribution represents relative frequencies of occurrence of unique character category sequences among a total number of the plurality of character category sequences. The dimension of input to the machine learning model is reduced as compared with input based on a frequency distribution of character sequences for the text-based content, which can reduce computational complexity and reduce memory utilization for the classification operation, without adversely affecting the accuracy of the result of the classification.

Certain aspects of the disclosure further concern a computer-implemented method for training a machine learning model to classify text-based content. The method includes receiving a plurality of examples of text-based content, each of which has a known classification, and performing training operations using the plurality of examples of text-based content. For each of the plurality of examples of text-based content, the training operations include generating a plurality of character category sequences for the example of text-based content using a plurality of characters of the example of text-based content. Each character category sequence, among the plurality of character category sequences for the example of text-based content, comprises multiple character category identifiers for multiple characters, respectively, of a different character sequence in the example of text-based content. Each character category identifier, among the multiple character category identifiers, identifies one of a plurality of predefined character categories. The training operations also include calculating a frequency distribution of the plurality of character category sequences for the example of text-based content, and training a machine learning model based on the calculated frequency distribution for the example of text-based content and the known classification of the example of text-based content. The frequency distribution represents relative frequencies of occurrence of unique character category sequences among a total number of the plurality of character category sequences. The dimension of input to the machine learning model is reduced as compared with input based on a frequency distribution of character sequences for the example of text-based content, which can reduce computational complexity and reduce memory utilization for the training operation, without adversely affecting the result of the training.

As described herein, a variety of other features and advantages can be incorporated into the technologies as desired.

BRIEF DESCRIPTION OF THE DRAWINGS

FIG. 3 is a table listing a partial list of some predefined Unicode categories.

FIG. 4 is example software code for calculating a frequency distribution of character category sequences for a text-based message.

DETAILED DESCRIPTION

Overview of Detection of Unsolicited Messages

Figure 1:
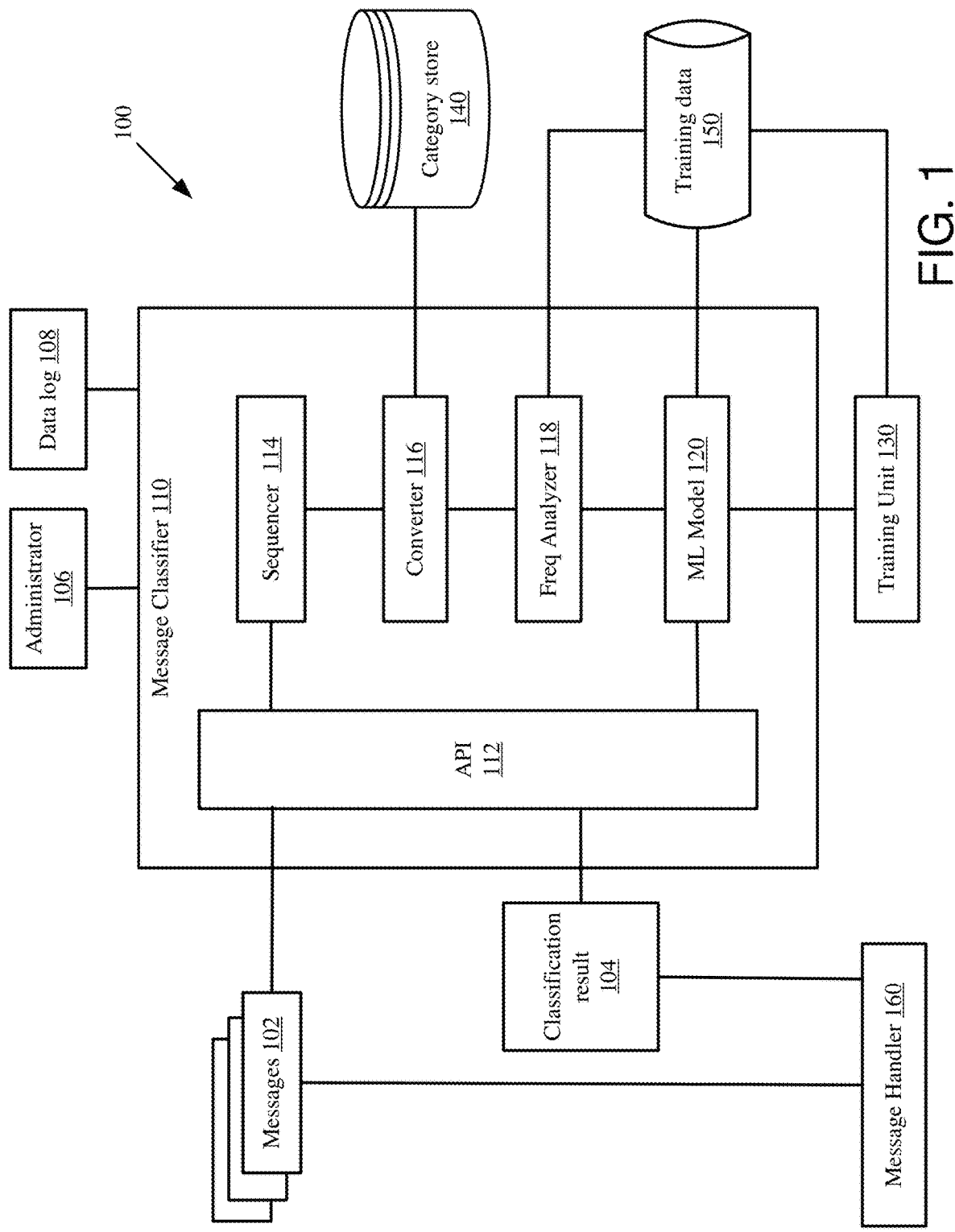
FIG. 1 is a block diagram depicting an example computing system for intelligent classification of text-based content.

Unsolicited text-based content is text-based content that a receiver did not ask or expect to receive. Such unsolicited text-based content can be sent through various forms of electronic communication, such as email, messaging apps, social media, or others. Unsolicited text-based content often contains fraudulent or malicious content, such as phishing links, malware, or scams, and can pose a significant threat to users' privacy and security. To combat the distribution of such unsolicited text-based content, various technologies can be used, such as machine learning algorithms, natural language processing, blacklists, etc., to identify and filter out unsolicited text-based content. For example, machine learning algorithms can analyze large datasets of unsolicited text-based content to identify common patterns and train models to automatically recognize and classify unsolicited text-based content. Natural language processing can analyze the linguistic features of text-based content to detect anomalies or suspicious patterns. Blacklists can maintain a list of known senders of unsolicited text-based content or malicious IP addresses and block unsolicited text-based content from these sources.

However, existing technologies for detection of unsolicited text-based content are not foolproof and can have limitations, such as (a) being unable to detect new or sophisticated techniques for generating unsolicited text-based content, (b) generating false positives, or (c) mistakenly flagging legitimate text-based content as unsolicited text-based content. Also, senders of unsolicited text-based content can use techniques to evade detection, such as using random or misspelled words, embedding grammatical errors, using unusual capitalizations and/or substituting letters in text with special characters or symbols. Such text manipulation can make it harder for automated detection of unsolicited text-based content.

Furthermore, short text-based content, such as text messages or social media posts, present special challenges for detection of unsolicited text-based content due to their limited length and informal language. Unlike longer text-based content (e.g., emails), which may contain more contextual information, short text-based content often relies on context and shared knowledge between the sender and receiver, making it harder for automated systems to determine the intent of the text-based content. Additionally, senders of unsolicited text-based content can use techniques such as URL shortening or code obfuscation to hide their true intentions or evade detection. Moreover, short text-based content can use slang, abbreviations, or non-standard grammar, making it difficult for existing technologies to distinguish between legitimate and unsolicited text-based content.

As described below, the intelligent text-based content classification technologies described herein can improve the accuracy and efficiency of detection of unsolicited text-based messages by extracting covert information (e.g., statistical properties of character sequences) embedded in the text-based content, and providing, as input, such information to a machine learning model for detection of unsolicited text-based content. For illustration purposes, text-based messages (or simply "messages") are used hereinafter as examples to illustrate the disclosed technologies, although it is to be understood that the disclosed technologies can be used for classification of any text-based content.

Example Computing System for Intelligent Classification of Text-Based Content

FIG. 1 shows a block diagram of an example computing system 100 configured for intelligent classification of text-based content (e.g., messages), according to the technologies described herein.

The system 100 includes a message classifier 110 configured to process incoming messages 102. As shown in FIG. 1, the message classifier 110 can include an application programming interface (API) 112, a sequencer 114, a converter 116, a frequency analyzer 118, and a machine learning (ML) model 120.

The API 112 can receive the messages 102 and, optionally, perform certain preprocessing of the messages 102 (e.g., verifying the messages 102 are sent from legitimate sources, checking whether the messages 102 contain viruses, etc.).

The received messages can be sent to the sequencer 114, which is configured to parse the messages and generate respective character sequences for the corresponding messages, as described further below.

The character sequences generated by the sequencer 114 for the respective messages can be converted into corresponding character category sequences for the respective messages based on a plurality of predefined character categories stored in a category store 140.

Alternatively, the ordering of the sequencer and converter can be switched, as described below, with the converter converting individual characters of a message into a series of corresponding categories (having category identifiers), and with the sequencer generating character category sequences for the message by scanning the series of corresponding categories.

Or, operations of the sequencer and converter can be performed concurrently, as described below, with characters of a message being scanned on a character-by-character basis (e.g., from the first character to the last character of the message), with corresponding character category identifiers being determined as the characters are scanned, and with character category sequences being generated as the character category identifiers are determined for new character sequences scanned in the message.

The frequency analyzer 118 can analyze the converted character category sequences for the respective messages. Specifically, for each message, the frequency analyzer 118 can calculate a frequency distribution of the converted character category sequences.

For each message, the calculated frequency distribution of the converted character category sequences can be fed to an input end of the ML model 120, which can classify the message 102 into one of a plurality of message classes or categories. For example, the ML model 120 can classify the message 102 as a normal message or an unsolicited message.

For each incoming message 102, a classification result 104 (e.g., a normal or unsolicited flag) can be generated as an output of the message classifier 110 (e.g., via the API 112).

For each incoming message 102, a message handler 160 can take appropriate actions for the message based on the corresponding classification result 104. For example, if the message 102 is classified as a normal message, the message 102 can be routed to intended recipient(s). On the other hand, if the message 102 is classified as an unsolicited message, the message handler 160 can block, quarantine, or otherwise restrict the message 102 from being distributed to the intended recipient(s). In some examples, the message handler 160 can automatically generate an alert or a warning message that the incoming message 102 is classified as an unsolicited message, e.g., in a header or other section of text appended to the message 102, or in a separate message.

The ML model 120 can be trained a priori, for example, by a training unit 130. The training unit 130 can train the ML model 120 using a plurality of training examples or messages (not the messages 102, but representative of such messages), each of which has a known classification (e.g., normal message or unsolicited message). Specifically, for each training message, a plurality of character sequences can be generated (e.g., by the sequencer 114), which can be converted into a plurality of character category sequences (e.g., by the converter 116), based on which a frequency distribution can be calculated (e.g., by the frequency analyzer 118). The calculated frequency distribution and the known classification for each training message can be saved in a training data repository 150, which can be used by the training unit 130 to train the ML model 120.

In some examples, metadata of the incoming messages (e.g., date and time, sender's name and address, subject line, message length, etc.) and the classification result 104 (and optionally, some intermediate results such as the frequency distributions, etc.) can also be stored in a data log 108.

In some examples, through an administrator console 106, an administrator can interact with the message classifier 110 (e.g., via a user interface) to monitor and/or control various aspects of the message classification. For example, through the administrator console 106, the administrator can review status of each stage of the message classification, configure parameters used for message classification, or the like. The administrator, through the administrator console 106, can also review the data log 108.

In some examples, once the classification result 104 for an incoming message 102 is independently verified, e.g., by the administrator, the calculated frequency distribution and the verified classification result 104 can also be saved in the training data repository 150. When a sufficient amount of new data has been added to the training data repository 150, the ML model 120 can be retrained or updated by the training unit 130.

Although the ML model 120 is shown to be included in the message classifier 110 in FIG. 1, it should be understood that in some examples, the ML model 120 can be external to and in communication with the message classifier 110.

In some examples, one or more components of the system 100 (e.g., message classifier 110, the training unit 130, the message handler 160, the training data repository 150, etc.) can reside in a cloud environment (e.g., the cloud-supported environment 1100 of FIG. 11, which is described further below). In some examples, any components of the system 100 can be parts of local computing devices or systems.

In practice, the systems and subsystems shown herein, such as system 100, can vary in complexity, with additional functionality, more complex components, and the like. For example, there can be additional functionality within the message classifier 110. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like) or over a bus or other interconnection mechanism in a local computing device or system.

The system 100 and any of the other systems/subsystems described herein can be implemented in conjunction with any of the hardware components described herein, such as the computing systems described below (e.g., processing units, memory, and the like). In any of the examples herein, the messages, character sequences, character category sequences, character categories, frequency distributions, and the like can be stored in one or more computer-readable storage media or computer-readable storage devices. The technologies described herein can be generic to the specifics of operating systems or hardware and can be applied in any variety of environments to take advantage of the described features.

Example Overall Method for Intelligent Classification of Text-Based Content

Figure 2:
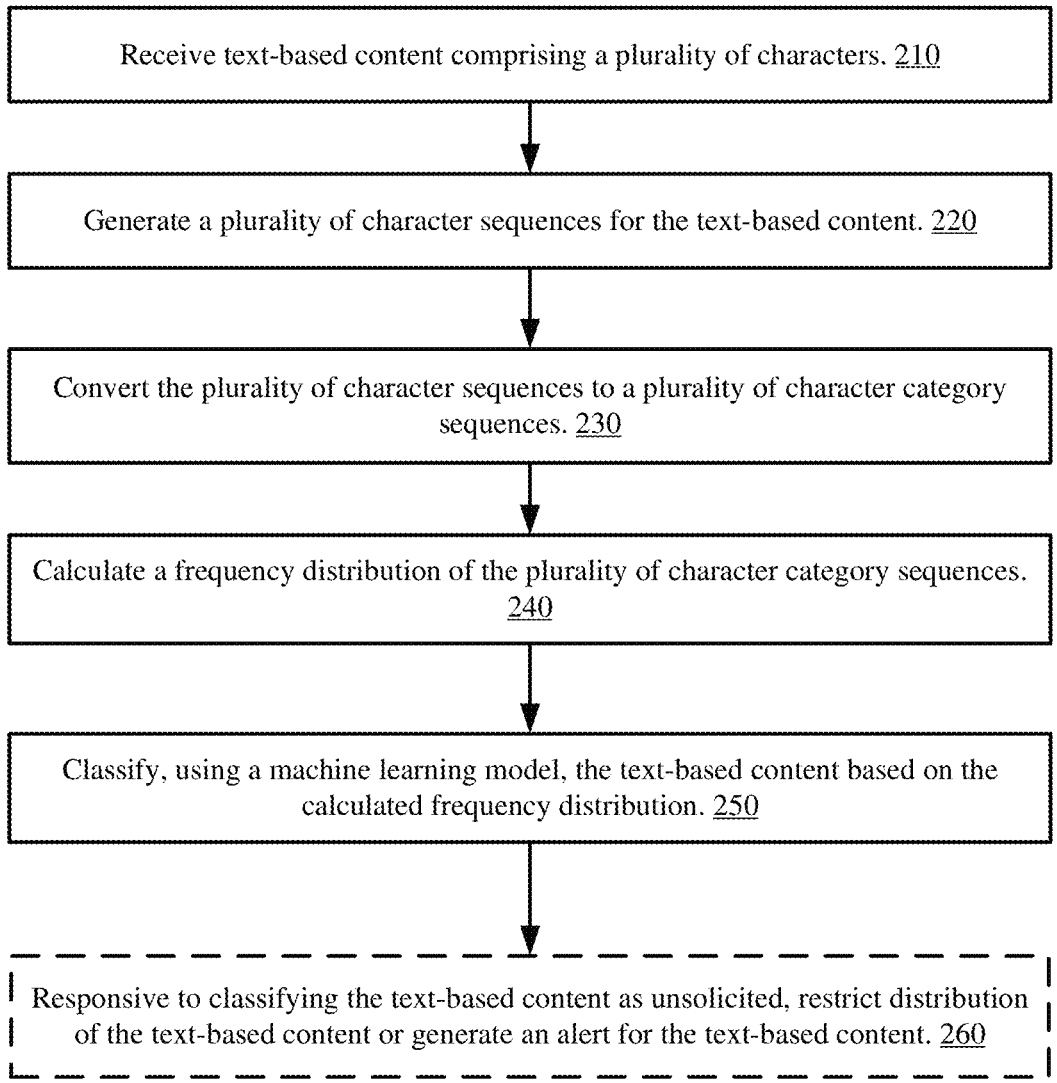
FIG. 2 is a flowchart of an example overall method for intelligent classification of text-based content.

FIG. 2 is a flowchart of an example overall method 200 for intelligent classification of text-based content, which can be performed, for example, by the system 100 of FIG. 1.

At 210, text-based content (e.g., message 102) including a plurality of characters can be received (e.g., by the API 112 of the message classifier 110).

A plurality of character category sequences are generated for the text-based content using the plurality of characters and based on a plurality of predefined character categories. For example, at 220, a plurality of character sequences can be generated (e.g., by the sequencer 114) for the text-based content, e.g., using the plurality of characters. Each of the character sequences has a count of characters that depends on implementation. For example, the count of characters per sequence can be two, three, or some other number of characters. The plurality of character sequences can, for example, by generated by scanning from a first character to a last character of the text-based content. In this way, the plurality of character sequences can be sequentially ordered so that adjacent character sequences, among the plurality of character sequences, are offset by one character.

At 230, the generated plurality of character sequences for the text-based content can be converted (e.g., by the converter 116) to a plurality of character category sequences for the text-based content. Such conversion can be based on a plurality of predefined character categories, which can be stored on a computer-readable medium (e.g., the category store 140). Examples of predefined character categories are described below with reference to FIG. 3. Alternatively, different predefined character categories can be used. To convert the plurality of character sequences to the plurality of character category sequences, operations can be performed for each of the plurality of character sequences. For example, characters in a character sequence can be converted to respective character category identifiers in a corresponding character category sequence, where each character category identifier identifies one of the plurality of predefined character categories.

Alternatively, the plurality of character category sequences can be generated for the text-based content with operations having a different timing. For example, a series of character category identifiers can be generated by converting respective characters of the text-based content into corresponding character category identifiers, where each of the character category identifiers identifies one of the plurality of predefined character categories. Then, the plurality of character category sequences can be generated by scanning the series of character category identifiers, from a first character category identifier to a last character category identifier of the series of character category identifiers. In this way, the plurality of character category sequences can be sequentially ordered so that adjacent character category sequences, among the plurality of character category sequences, are offset by one character category identifier.

Or, as another example of timing of operations when the plurality of character category sequences are generated, the plurality of text characters of the text-based content can be scanned on a character-by-character basis (e.g., from the first character to the last character of the text-based content). As the respective characters are scanned, corresponding character category identifiers are determined, where each of the character category identifiers identifies one of the plurality of predefined character categories. For each of a plurality of character sequences for the text-based content (e.g., for each pair of characters, or for each triplet of characters, etc.), a corresponding character category sequence can be determined using the character category identifiers for the characters of that character sequence. In this way, the plurality of character category sequences can be generated, one character category sequence at a time, as the characters of the text-based content are scanned. FIG. 4 shows an example of operations having this timing for an example implementation.

At 240, a frequency distribution of the plurality of character category sequences for the text-based content can be calculated (e.g., by the frequency analyzer 118). As used herein, the term "frequency distribution" indicates any representation of a pattern of occurrences of possible character category sequences in the plurality of category sequences for the text-based content. For example, the frequency distribution for the text-based content can be a count of the number of occurrences for the possible character category sequences, respectively, in the plurality of category sequences for the text-based content. Or, as another example, the frequency distribution for the text-based content can be percentage values representing the likelihood of occurrence for the possible character category sequences, respectively, in the plurality of category sequences for the text-based content. Or, as another example, the frequency distribution for the text-based content can be any other metrics representing the frequency or likelihood of occurrence for the possible character category sequences, respectively, in the plurality of category sequences for the text-based content. Depending on implementation, the frequency distribution can be exact or approximate due to rounding or quantization.

Intermediate values used to calculate the frequency distribution for the text-based content can be updated concurrently with generation of the plurality of character category sequences for the text-based content. For example, a histogram that tracks counts of occurrences for different possible character category sequences can be updated while the plurality of character category sequences are generated, even if the final values for the frequency distribution are not calculated until after all of the plurality of character category sequences have been generated.

Then at 250, the text-based content can be classified (e.g., by the trained ML model 120) as normal or unsolicited based on the calculated frequency distribution (e.g., by providing, as input, the calculated frequency distribution of the plurality of character category sequences to the trained ML model 120).

Optionally, at 260, an action can be taken for the text-based content based on the classification result of step 250. For example, responsive to classifying the text-based content as unsolicited, distribution of the text-based content can be restricted or an alert for the text-based content can be generated (e.g., by the message handler 160). Or, responsive to classifying the text-based content as normal, distribution of the text-based content using a regular procedure can occur.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example Character Sequences

As described above, a sequencer (e.g., 114) can parse text-based content (e.g., a message) to generate a plurality of character sequences.

In some examples, the plurality of character sequences can be generated from text-based content by scanning from a first character to a last character of the text-based content on a character-after-character basis, so that the plurality of character sequences are sequentially ordered, and so that each two adjacent character sequences are offset by one character. Alternatively, the characters of text-based content can be scanned in a different order, e.g., last character to first character.

As described herein, each character sequence can have a predefined length (L). Thus, if the text-based content has N characters (assuming N>L), then a total of (N−L+1) character sequences can be generated from the text-based content. In one specific example, each character sequence can include two characters (L=2). In this scenario, the number of character sequences generated from the text-based content is N−1. In other examples, each character sequence can have more than two characters (e.g., three, four, five, six, or more characters). Unless described otherwise, two-character sequences are used in the following examples, although it should be understood that the technologies disclosed herein can also be used when each character sequence has more than two characters.

As an example, let's assume one message (classified as a normal message) contains the following single sentence included in a pair of double quotation marks: "Let's meet at 6:30!" This message has nineteen characters including spaces, based on which the following eighteen character sequences (each being included in a pair of square brackets) can be generated: [Le], [et], [t'], ['s], [s], [m], [me], [ee], [et], [t], [a], [at], [t], [6], [6:], [: 3], [30], and [0!].

As another example, let's assume another message (classified as an unsolicited message) contains the following sentence included in a pair of double quotation marks: "LET$ m33t @ 6:30". This message has seventeen characters including spaces (with one occurrence of a double space marks), based on which the following sixteen character sequences (each being included in a pair of square brackets) can be generated: [LE], [ET], [T$], [$], [ ], [m], [m3], [33], [3t], [t], [@], [@], [6], [6:], [: 3], and [30].

The examples in this section illustrate two representative messages, one normal and one unsolicited. In practice, text-based content can have any combination of characters.

The examples in this section are English-language messages, but the approaches described herein can be applied to text-based content in various other languages. In certain circumstances, the term "character" or "text character" indicates any symbol used in a writing system, but not a series of such symbols for a word. For example, a character can be a letter of an alphabet, a symbol for a syllable in a syllabary, a numerical digit, a grammatical mark, a punctuation mark, or another typographical symbol, or "special character" such as mathematical symbols, currency symbols, and emoji. In certain circumstances, the term "character" or "text character" refers to any symbol used in a writing system except for a logogram used in a logography (e.g., Chinese character, etc.).

Example Character Category Sequences

As described above, each character sequence can be converted into a corresponding character category sequence (e.g., by the converter 116) based on a plurality of predefined character categories. The predefined character categories can depend on implementation.

In some examples, the predefined character categories can be Unicode categories. Maintained by the Unicode Consortium, Unicode is a standard for encoding, representing, and handling text in a wide variety of writing systems. For those writing systems, it provides a unique numerical value (also known as a code point) for every character used in writing, which is used to represent the character in digital form. Unicode supports a wide range of scripts, including Latin, Greek, Cyrillic, Arabic, Hebrew, Chinese, Japanese, Korean, and many others. It also includes a large number of special characters, such as mathematical symbols, currency symbols, and emoji.

Unicode categories are a way of categorizing Unicode characters based on their properties. FIG. 3 shows a table 300 which lists some of the Unicode categories in an example implementation. For each Unicode category, the table 300 shows a category name (e.g., "UppercaseLetter"), a category number or identifier (ID), and a brief description of the category, including the corresponding two-letter Unicode designation (e.g., "Lu"). In the example implementation, the number of Unicode categories can be 31 or 30, depending on whether "Reserved, noncharacter (Cn)" and "Reserved, reserved (Cn)" are treated as two separate Unicode categories or combined into one Unicode category.

In some examples, the predefined character categories can be other than existing Unicode categories. For example, a user can combine multiple Unicode categories into one user-defined character category (e.g., a user can combine Connector Punctuation (Pc) Unicode category and Dash Punctuation (Pd) Unicode category into one user-defined character category). As another example, a user can arbitrarily define character categories based on needs and/or experience. In some examples, the predefined character categories can be different for different alphabets and/or scripts (e.g., Latin, Greek, Cyrillic, Arabic, Hebrew, Chinese, Japanese, Korean, and the like).

As described herein, converting the plurality of character sequences for a message to the plurality of character category sequences for the message includes converting characters in each character sequence of the message to respective character category identifiers in a corresponding character category sequence. Each character category identifier can uniquely identify one of the plurality of predefined character categories. Referring to FIG. 3, the character category identifier can be the category name (e.g., a name in the first column of table 300), the category ID (e.g., a number in the second column of table 300), the Unicode designation (e.g., a two-letter string listed in the third column of table 300), or any other identifiers that can uniquely identify different character categories.

Thus, the number of characters in a character sequence equals the number of character category identifiers in the converted character category sequence. For example, assuming Unicode designations are used as character category identifiers, the character sequence [Le] can be converted to the character category sequence Lu-Ll (indicating an upper-case letter is followed by a lower-case letter), the character sequence [$] can be converted to the character category sequence Sc-Zs (indicating a currency symbol is followed by a space separator), and so on.

By converting the character sequences into corresponding character category sequences, the number of unique character category sequences is significantly reduced compared to the number of unique character sequences. For example, for character sequences containing two characters selected from U possible characters, while there can be millions of permutations of combining (hundreds or thousands of) unique characters (U×U), the total number of unique character category sequences is limited to M×M, where M is the number of predefined character categories (e.g., if M=30, the total number of unique character category sequences is 900, whereas if U=1,000, the total number of unique character sequences is 1,000,000).

Example Frequency Distributions of Character Category Sequences

As described above, for each message, a frequency distribution of the converted character category sequence can be calculated (e.g., by the frequency analyzer 118). Specifically, the frequency distribution measures a relative frequency of occurrence of each unique character category sequence among the total number of converted character category sequences. For example, the example message "Let's meet at 6:30!" can be converted into a total of eighteen character category sequences. Using Unicode designations as character category identifiers, the character category sequence Lu-Ll (indicating an upper-case letter followed by lower-case letter) appears only once (i.e., [Le]). Thus, its corresponding frequency is $1/18=5.6\%$. The character category sequence Ll-Ll (indicating a lower-case letter followed by a lower-case letter) appears five times (i.e., [et], [me], [ee], [et], and [at]). Thus, its corresponding frequency is 5/18=27.8%; and so on.

As an example, FIG. 4 shows example software code 400 (written in C#) which can be used to parse a message (input "text") containing a plurality of text characters, generate a plurality of character category sequences (each containing two character category identifiers) for the message using the plurality of text characters and based on a plurality of predefined Unicode categories, and calculate a frequency distribution of the plurality of character category sequences.

Figure 5:
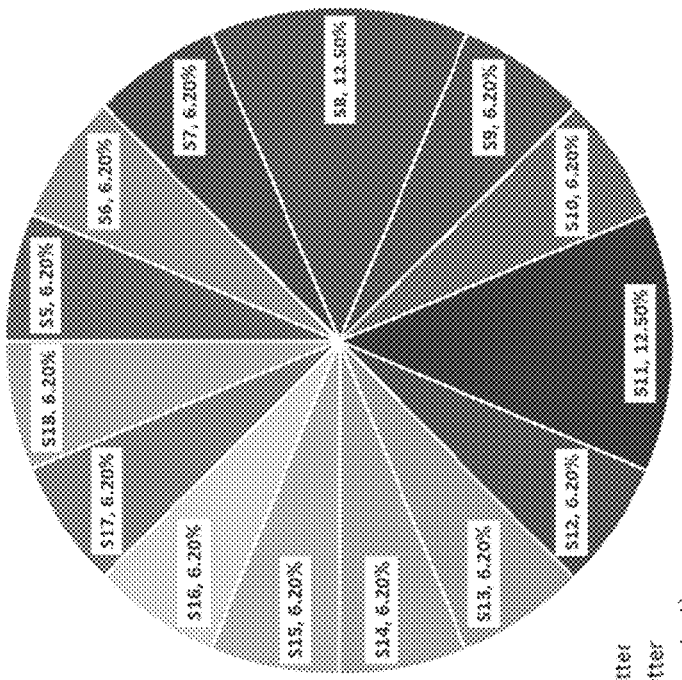
FIG. 5 depicts example pie charts showing frequency distributions of character category sequences obtained from two different messages.

FIG. 5 depicts two pie charts 510 and 520, which respectively show the calculated frequency distributions of the character category sequences for the following two example messages: "Let's meet at 6:30!" and "LET$ m33t @ 6:30". For simplicity, each unique character category sequence has an abbreviated sequence number, e.g., S1 indicates a lower-case letter followed by a lower-case letter, S2 indicates an upper-case letter followed by a lower-case letter, etc. As shown, the message "Let's meet at 6:30!" has ten different character category sequences (S1-S10), and the message "LET$ m33t @ 6:30" has fourteen different character category sequences (S5-S18).

Different patterns of frequency distribution of the character category sequences can be used to classify text-based content, e.g., distinguish normal messages from unsolicited messages. In the example depicted in FIG. 5, four character category sequences (S1-S4) are unique to the message "Let's meet at 6:30!", and hence indicative of a normal message (in the context of this simple example). In contrast, eight character category sequences (S11-S18) are unique to the message "LET$ m33t @ 6:30" and hence indicative of an unsolicited message (again, in the context of this simple example). Thus, assuming the message "Let's meet at 6:30!" is a normal message and the message "LET$ m33t @ 6:30" is an unsolicited message, the combination of some character category sequences (e.g., S11-S18) may represent a signature pattern for unsolicited messages, or at least indicate a higher probability that the underlying messages contain language that is characteristic of unsolicited messages.

Notably, some character category sequences can be common in both normal messages and unsolicited messages (e.g., S5-S10 appear in both messages for the example shown in FIG. 5). Additionally, some character category sequences, although appearing less frequently in normal messages (e.g., Lu-Lu, indicating an upper-case letter followed by an upper-case letter), do not necessarily mean a message is an unsolicited message. On the flipside, some character category sequences, although appearing frequently in normal messages (e.g., Ll-Ll, indicating a lower-case letter followed by a lower-case letter), do not preclude the possibility that a message is an unsolicited message. In some examples, a trained ML model can be used to more accurately classify normal and unsolicited messages based on frequency distribution of the character category sequences, as described further below.

Example Machine Learning Model for Intelligent Classification of Text-Based Content As described above, a ML model (e.g., 120) can be used to classify a message as a normal message or an unsolicited message based on the calculated frequency distribution of the character category sequences. The ML model can be previously trained (e.g., by the training unit 130) using a plurality of examples of text-based content (e.g., training messages) with known normal/unsolicited classifications.

Figure 6:
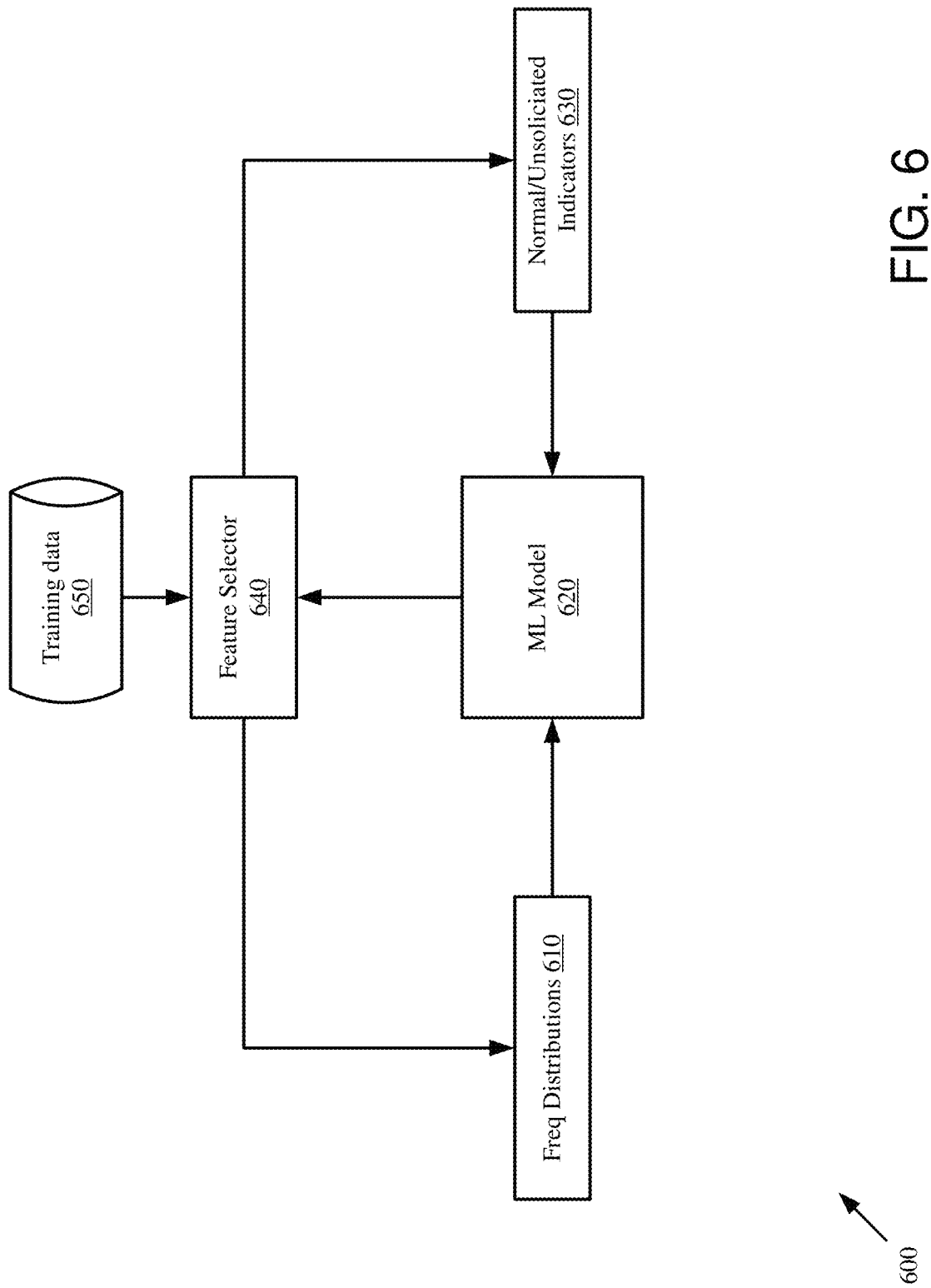
FIG. 6 is a block diagram for an example system for training a machine learning model for intelligent classification of text-based content.

FIG. 6 depicts an example system 600 for training a ML model 620 for intelligent classification of text-based content. The ML model 620 can be an embodiment of the ML model 120. As shown, the ML model 620 can be trained using stored training data 650 (similar to the data stored in the training data repository 150 of FIG. 1). As described above with reference to FIG. 2 for an incoming message, for each training message, a plurality of character category sequences can be generated, based on which a frequency distribution can be calculated.

An input of the ML model 620 can include a feature vector configured to receive the calculated frequency distributions 610 of the training messages, respectively, and an output of the ML model 620 can be configured to receive the normal/unsolicited indicators 630 of the training messages, respectively.

In some examples, the feature vector of the ML model 620 can include the calculated frequencies for all unique character category sequences. For example, if M is the number of predefined character categories, the feature vector of the ML model 620 can include the calculated frequencies of M× M unique character category sequences, even if the calculated frequencies for some of the unique character category sequences are zero.

In other examples, the feature vector of the ML model 620 can include the calculated frequencies for only a subset of all unique character category sequences that are the most impactful when classifying a message. Which character category sequences are used in the feature vector of the ML model 620 can be determined by a feature selector 640. As a result, the dimension of the feature vector can be reduced, which can improve the speed and efficiency of training the ML model 620 without comprising the classification accuracy.

For example, if it is determined that certain character category sequences never occur in any of the training messages, then the feature selector 640 can remove the calculated frequencies for these character category sequences (which are zero for all training messages) from the feature vector of the ML model 620. In this scenario, the feature vector of the ML model 620 can have a dimension which is equal to a count of unique character category sequences appearing at least once in the training messages.

As another example, if it is determined that certain character category sequences never occur or their occurrence is extremely rare (e.g., below a predefined threshold), then the calculated frequencies for these character category sequences can be added to generate an aggregate frequency for a new character category sequence for each training message. That is, all of these low-frequency character category sequences can be lumped together as a "miscellanea" or "other" character category sequence. In this scenario, the feature selector 640 can substitute the calculated frequencies for these low-frequency character category sequences with the aggregate frequency representing the "miscellanea" character category sequence. If the number of these low-frequency character category sequences that are lumped together is K, then the dimension of the feature vector can be reduced by K−1 by substituting the calculated frequencies for these low-frequency character category sequences with the aggregate frequency representing the "miscellanea" character category sequence.

In some examples, the feature vector of the ML model 620 can include additional meta-data of the training messages other than the calculated frequencies of unique character category sequences. For example, the feature vector can include a character count of each training message. As another example, the feature vector can include the language for each training message. Or, as another example, the feature vector can include a message type for each training message (e.g., email, text message, etc.). Other pertinent information of the training messages (e.g., date and time, sender's name and/or address, etc.) can also be included in the feature vector.

Alternatively, the ML model 620 can be trained separately for different types of training messages. For example, the ML model 620 can be trained separately for messages in different languages. Or, the ML model 620 can be trained separately for different message types (e.g., email, text message, etc.). Subsequently, depending on a pre-classification of an incoming message (e.g., to identify the language of the incoming message, or to identify the message type of the incoming message), the appropriate trained ML model 620 is used.

The ML model 620 can be configured to implement a supervised machine learning algorithm to derive or estimate optimal model parameters that minimize a specific objective function or loss function based on the training data. Specifically, the supervised machine learning algorithm can produce predicted normal/unsolicited classifications based on the input frequency distributions 610 and compare the predicted classifications with known normal/unsolicited indicators 630, and the difference between the predicted classifications and the true labels (known indicators 630) can be used to calculate the loss function. The supervised machine learning algorithm can iteratively adjust the model parameters until the loss function is minimized to an acceptable level or until a stopping criterion is met. Once the training is complete, the model parameters can be fixed, and the ML model 620 can be used to make normal/unsolicited classifications based on a new set of frequency distributions of character category sequences for an incoming message.

In some examples, the ML model 620 can comprise a neural network such as a deep neural network having an input layer, one or more hidden layers for which model parameters are computed, and an output layer (which produces a classification). In some examples, the ML model 620 can be configured to implement other classification algorithms, such as decision trees, Bayesian networks, supper vector machines, logistic regression, K-nearest neighbor, hidden Markov models, etc.

Although in the depicted examples, each example of text-based content is classified by the ML model 620 to be normal or unsolicited, it is to be understood that the ML model 620 can be trained to classify text-based content into more than two classes or categories. For example, the unsolicited class can be divided into two or more sub-classes (e.g., very likely unsolicited, maybe unsolicited, etc.) based on certain predictive and/or statistical metrics calculated by the ML model 620.

Figure 7:
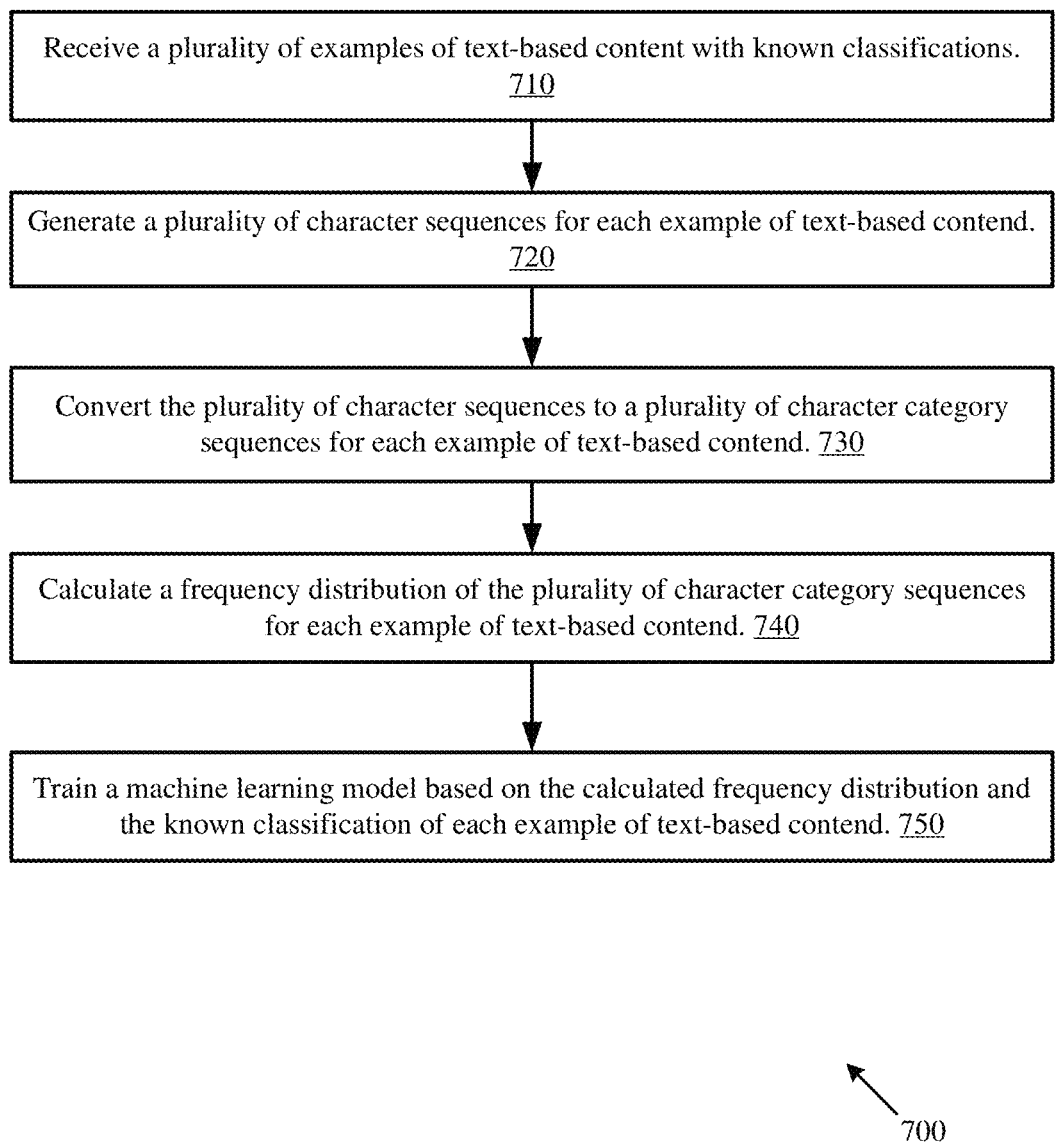
FIG. 7 is a flowchart of an example overall method for training a machine learning model for intelligent classification of text-based content.

Example Overall Method for Training Machine Learning Model for Intelligent Classification of Text-Based Content FIG. 7 is a flowchart of an example overall method 700 for training a ML model for intelligent classification of text-based content, and can be performed, e.g., by the system 100 of FIG. 1.

At 710, a plurality of examples of text-based content (e.g., training messages) can be received. Each example of text-based content has a known classification (e.g., normal message or an unsolicited message).

Training operations are then performed for the examples of text-based content. In FIG. 7, the training operations are shown as being performed for all examples concurrently (e.g., generating character category sequences for all of the examples, then calculating frequency distributions for all of the examples). In practice, on an example-by-example basis, all of the training operations can be performed for a given example of text-based content, followed by all of the training operations for the next example of text-based content, and so on.

A plurality of character category sequences can be generated for each example of text-based content using the plurality of text characters in that example of text-based content and based on a plurality of predefined character categories. For example, at 720, a plurality of character sequences for each example of text-based content can be generated (e.g., by the sequencer 114), as described with reference to FIG. 2. Then, at 730, for each example of text-based content, the plurality of character sequences can be converted (e.g., by the converter 116) to a plurality of character category sequences based on a plurality of predefined character categories, as described with reference to FIG. 2. In some examples, the predefined character categories can be the Unicode categories, as described above.

Alternatively, the plurality of character category sequences can be generated for each example of text-based content with operations having a different timing, as described above with reference to FIG. 2.

At 740, a frequency distribution of the plurality of character category sequences for each example of text-based content can be calculated (e.g., by the frequency analyzer 118), as described above with reference to FIG. 2.

At 750, a ML model (e.g., the ML model 120 or 620) can be trained based on the calculated frequency distribution and the known classification of each example of text-based content. For example, the calculated frequency distributions can be used for the training operations, as described above with reference to FIG. 6.

Example Methods for Dimensionality Reduction

In some examples, the dimension of the feature vector used by the ML model (e.g., 120 or 620) can be further reduced after training the ML model. In other words, it is possible that only a subset of all unique character category sequences used in training the ML model are actually useful for classifying incoming text-based content.

In some examples, the calculated frequencies for some character category sequences may have little predictive power for the ML model (e.g., the frequency of certain character category sequences does not signify whether the underlying message is a normal message or an unsolicited message). In such scenarios, the frequencies for these character category sequences can be removed from the feature vector, thereby reducing the dimensionality of the feature vector of the ML model.

On the other hand, even if the calculated frequencies for some character category sequences are very small (indicating these character category sequences are very rare), such small frequencies may have a relatively large predictive power (e.g., such rare character category sequences may be signatures of an unsolicited message). In such scenarios, the frequencies for these character category sequences should be preserved in the feature vector.

Various dimensionality reduction techniques (which use unsupervised learning algorithms) can be used to reduce the number of features (e.g., frequencies of unique character category sequences) while preserving pertinent information for classification of text-based content. In some examples, the feature selector 640 of FIG. 6 can be configured to implement one or more dimension reduction algorithms. Example dimensionality reduction algorithms include principal component analysis (PCA), independent component analysis (ICA), linear discriminant analysis (LDA), t-distributed stochastic neighbor embedding (t-SNE), autoencoders, etc.

Reducing dimensionality of the feature vector of the ML model not only can reduce the computational complexity and improve the efficiency of the ML model, but also can reduce the risk of overfitting (e.g., when the ML model becomes too complex and starts to fit noise in the data in the training messages).

To ensure that the dimensionality reduction of the ML model does not remove important information from the data, which can lead to loss of classification accuracy and/or performance, implementation of the dimensionality reduction can be guided by one or more metrics measuring performance of the ML model in classifying the training messages. Example performance metrics include explained variance ratio, reconstruction error, classification accuracy, etc.

Figure 8:
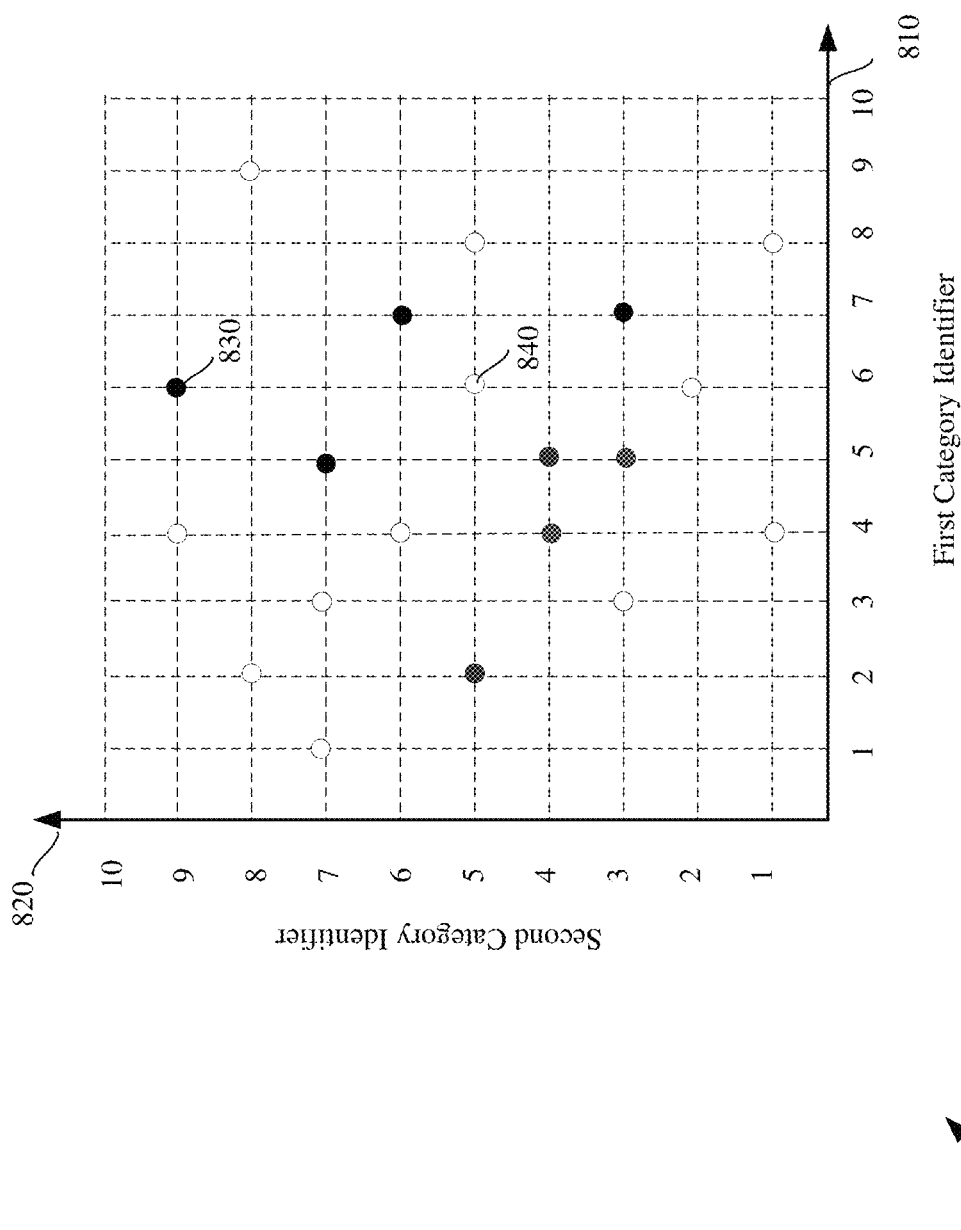
FIG. 8 schematically depicts a two-dimensional space defining a feature vector used as input in a machine learning model for intelligent classification of text-based content.

For illustration purposes, FIG. 8 schematically depicts a two-dimensional space defining a feature vector used in a ML model for intelligent classification of text-based content (for character sequences containing three or more characters, a three or higher dimensional space can be constructed to define the feature vector). For simplicity, it is assumed that there are ten predefined character categories, and each character category sequence has two category identifiers (ranging from 1 to 10). The horizontal axis 810 indicates a first category identifier and the vertical axis 820 indicates a second category identifier. Thus, the total number of unique character category sequences is 10×10=100, as represented by the intersections of ten dashed horizontal lines and ten dashed vertical lines.

In some examples, the frequencies for all 100 unique character category sequences can be included in the feature vector of the ML model.

In other examples, the feature vector can be initially reduced by excluding character category sequences that never occur in the training messages, as described above. In the example depicted in FIG. 8, the remaining character category sequences (occurring at least once in the training messages) after removing the zero-frequency character category sequences are shown as twelve open circles 840 and eight solid circles 830. Thus, the dimension of the feature vector can be reduced from 100 to 20.

In some examples, one or more dimensionality reduction techniques described above can be used to reduce the dimensionality of the feature vector. Such dimensionality reduction can be performed on the initial full set of 100 character category sequences or on the reduced set of 20 character category sequences (i.e., after initial exclusion of the zero-frequency character category sequences). In the example depicted in FIG. 8, such dimensionality reduction can result in a reduced feature vector including the frequencies of only eight character category sequences represented by the solid circles 830 (i.e., frequencies of the character category sequences represented by the twelve open circles 840 are removed from the feature vector).

Example Advantages

A number of advantages can be achieved via the technologies described herein.

One of the technical problems solved by the disclosed technologies is inaccurate classification of text-based content. For example, existing technologies for detection of unsolicited messages often have difficulties to accurately distinguish normal and unsolicited messages, especially for short messages. Technical solutions disclosed herein include constructing character category sequences from text-based content, recognizing that character category sequences of different classes of text-based content (such as normal messages and unsolicited messages) have different sequence patterns, even in short examples of text-based content. Technical effects achieved by such technical solutions include extracting covert information embedded in text-based content, thereby leading to improved accuracy of classification of text-based content (e.g., more accurate detection of unsolicited messages). With such classification information, text-based content can be more efficiently handled by automated processing systems and/or by end users.

Another technical problem solved by the disclosed technologies is high utilization of computing resources for classification of text-based content. For example, some approaches for classifying text-based content employ complicated natural language processing techniques which are computationally expensive. Further, some approaches for classifying text-based content use complex machine learning models that demand a large memory space in order to handle numerous possible sequences of characters that may exist in the text-based content. Technical solutions disclosed herein include converting character sequences into character categories sequences for purposes of classification. Technical effects achieved by such technical solutions include significantly reducing the dimension of input data to a ML model (e.g., from millions of unique character sequences to hundreds of unique character category sequences) while still capturing the underlying character sequence information, thereby not only making it computationally feasible to perform classification of text-based content in real time or with minimal processing delay, but also significantly reducing the memory usage and computational complexity of a ML model. Thus, disclosed technologies can perform classification operations in a much more efficient way.

Technical solutions disclosed herein also include calculating frequency distributions of character category sequences (to extract statistical properties of the underlying character sequences), and training a ML model using frequency distributions of character category sequences instead of frequency distributions of character sequences. Technical effects achieved by such technical solutions include training the ML model more efficiently in terms of speed and usage of computing resources (e.g., memory, CPU time, etc.) because the data used for training the ML model can be transformed from a high-dimensional space (defined by unique character sequences that occur or relative frequency distributions thereof) into a lower-dimensional space (defined by the unique character category sequences that occur or relative frequency distributions thereof). Moreover, compared to existing technologies which use natural language processing or other text-based classification, the disclosed technologies have the technical effects of resulting in more accurate message classification because the frequency distributions of character category sequences can contain more predictive features than original character sequences.

Additionally, technical solutions disclosed herein include reducing the dimensionality of the feature vector used by the ML model, thereby having the technical effects of further reducing computational complexity of training (and classification) and lowering the risk of overfitting without compromising performance (e.g., accuracy) of classification of text-based content.

Example Computing Systems

Figure 9:
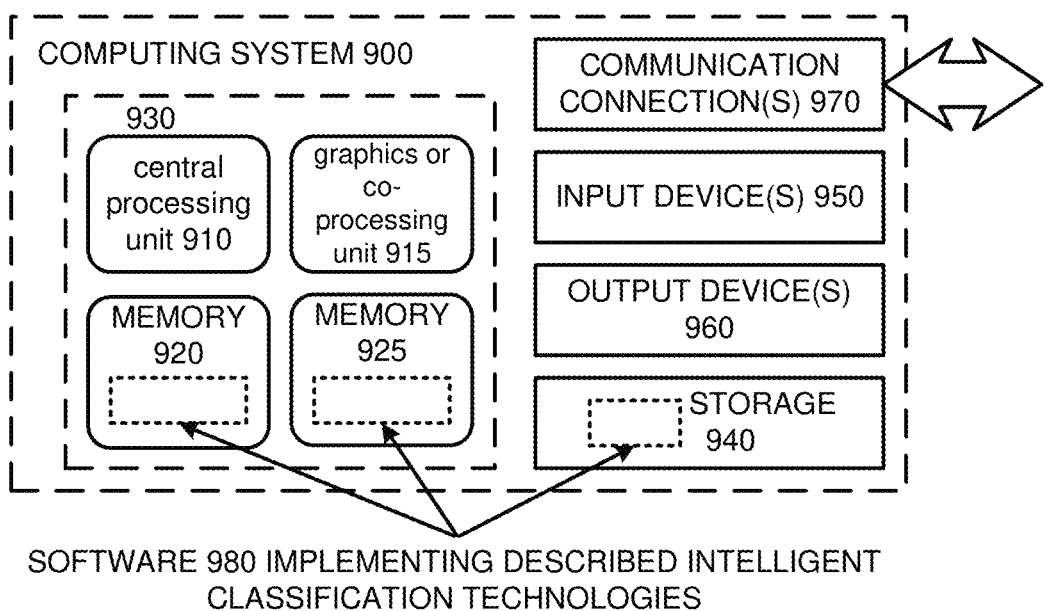
FIG. 9 is a diagram of an example computing system in which some described intelligent classification technologies can be implemented.

FIG. 9 depicts a generalized example of a suitable computing system 900 in which the described technologies may be implemented. The computing system 900 is not intended to suggest any limitation as to scope of use or functionality, as the technologies may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 can execute computer-executable instructions, such as for implementing the methods described in the examples herein. A processing unit can be a general-purpose central processing unit (CPU), processor in an application-specific integrated circuit (ASIC), or any other type of processor. A processing unit can also comprise multiple processors. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more technologies described herein, in the form of computer-executable instructions suitable for execution by the processing unit(s).

A computing system may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information and which can be accessed within the computing system 900. The storage 940 stores instructions for the software 980 implementing one or more technologies described herein.

The input device(s) 950 may be a touch input device such as a keyboard, mouse, pen, or trackball, a voice input device, a scanning device, or another device that provides input to the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms indicate operations performed by a computer, and should not be confused with acts performed by a human being. The actual computer operations corresponding to these terms vary depending on implementation.

Example Mobile Devices

Figure 10:
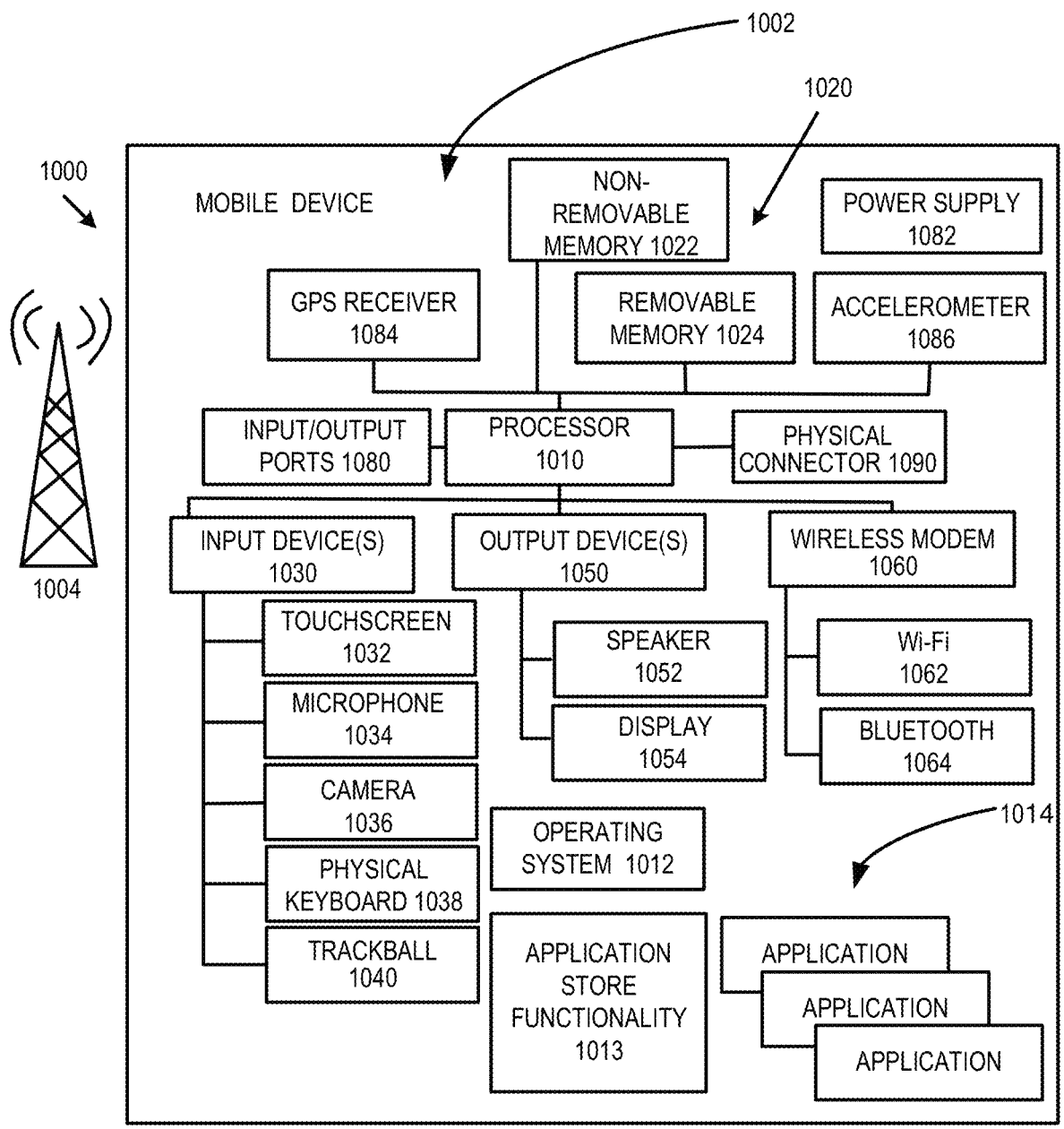
FIG. 10 is an example mobile device that can be used in conjunction with the intelligent classification technologies described herein.

FIG. 10 is a system diagram depicting an example mobile device 1000 including a variety of optional hardware and software components, shown generally at 1002, in which described embodiments, techniques, and technologies may be implemented. Any components 1002 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 1004, such as a cellular, satellite, or other network.

The illustrated mobile device 1000 can include a controller or processor 1010 (e.g., signal processor, microprocessor, ASIC, or other control and processing logic circuitry) for performing such tasks as signal coding, data processing, input/output processing, power control, and/or other functions. An operating system 1012 can control the allocation and usage of the components 1002 and support for one or more application programs 1014. The application programs can include common mobile computing applications (e.g., email applications, calendars, contact managers, web browsers, messaging applications), or any other computing application. Functionality 1013 for accessing an application store can also be used for acquiring and updating application programs 1014. The application programs 1014 can also include applications related to text-based message processing. Specifically, one or more of the application programs 1014 can be configured for implementing the intelligent unsolicited message detection technologies described herein.

The illustrated mobile device 1000 can include memory 1020. Memory 1020 can include non-removable memory 1022 and/or removable memory 1024. The non-removable memory 1022 can include RAM, ROM, flash memory, a hard disk, or other well-known memory storage technologies. The removable memory 1024 can include flash memory or a Subscriber Identity Module (SIM) card, which is well known in GSM communication systems, or other well-known memory storage technologies, such as "smart cards." The memory 1020 can be used for storing data and/or code for running the operating system 1012 and the applications 1014. Example data can include web pages, text, images, sound files, video data, or other data sets to be sent to and/or received from one or more network servers or other devices via one or more wired or wireless networks. The memory 1020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1000 can support one or more input devices 1030, such as a touchscreen 1032, microphone 1034, camera 1036, physical keyboard 1038 and/or trackball 1040 and one or more output devices 1050, such as a speaker 1052 and a display 1054. Other possible output devices (not shown) can include piezoelectric or other haptic output devices. Some devices can serve more than one input/output function. For example, touchscreen 1032 and display 1054 can be combined in a single input/output device.

The input devices 1030 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (e.g., EEG and related methods). Thus, in one specific example, the operating system 1012 or applications 1014 can comprise speech-recognition software as part of a voice user interface that allows a user to operate the device 1000 via voice commands. Further, the device 1000 can comprise input devices and software that allows for user interaction via a user's spatial gestures, such as detecting and interpreting gestures to provide input to a gaming application.

A wireless modem 1060 can be coupled to an antenna (not shown) and can support two-way communications between the processor 1010 and external devices, as is well understood in the art. The modem 1060 is shown generically and can include a cellular modem for communicating with the mobile communication network 1004 and/or other radio-based modems (e.g., Bluetooth 1064 or Wi-Fi 1062). The wireless modem 1060 is typically configured for communication with one or more cellular networks, such as a GSM network for data and voice communications within a single cellular network, between cellular networks, or between the mobile device and a public switched telephone network (PSTN).

The mobile device can further include at least one input/output port 1080, a power supply 1082, a satellite navigation system receiver 1084, such as a Global Positioning System (GPS) receiver, an accelerometer 1086, and/or a physical connector 1090, which can be a USB port, IEEE 1394 (FireWire) port, and/or RS-232 port. The illustrated components 1002 are not required or all-inclusive, as any components can be deleted and other components can be added.

Example Cloud-Supported Environment

Figure 11:
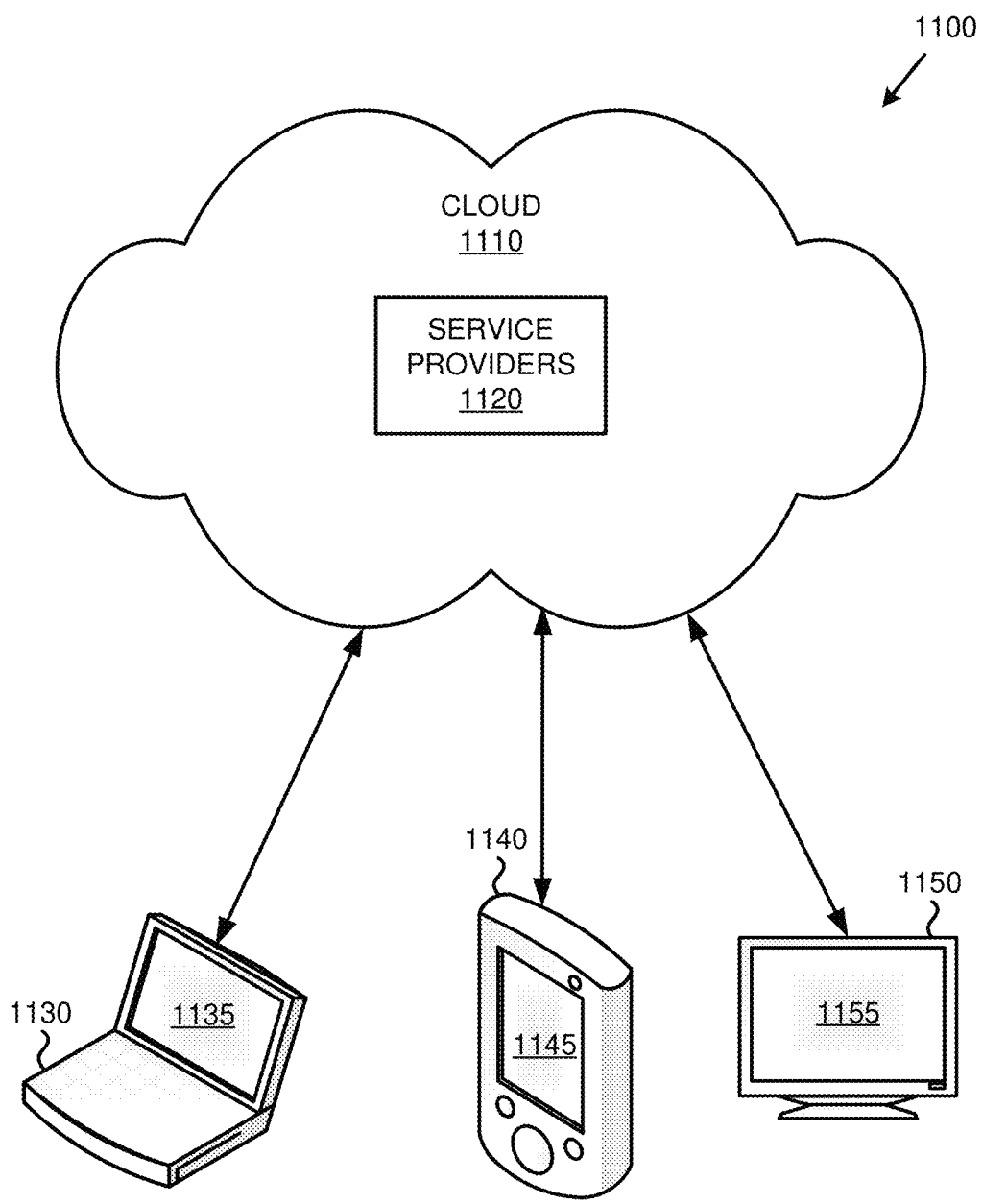
FIG. 11 is an example cloud-support environment that can be used in conjunction with the intelligent classification technologies described herein.

FIG. 11 illustrates a generalized example of a suitable cloud-supported environment 1100 in which described embodiments, techniques, and technologies may be implemented. In the example environment 1100, various types of services (e.g., computing services) are provided by a cloud 1110. For example, the cloud 1110 can comprise a collection of computing devices, which may be located centrally or distributed, that provide cloud-based services to various types of users and devices connected via a network such as the Internet. The implementation environment 1100 can be used in different ways to accomplish computing tasks. For example, some tasks (e.g., processing user input and presenting a user interface) can be performed on local computing devices (e.g., connected devices 1130, 1140, 1150) while other tasks (e.g., storage of data to be used in subsequent processing) can be performed in the cloud 1110.

In example environment 1100, the cloud 1110 provides services for connected devices 1130, 1140, 1150 with a variety of screen capabilities. Connected device 1130 represents a device with a computer screen 1135 (e.g., a mid-size screen). For example, connected device 1130 could be a personal computer such as desktop computer, laptop, notebook, netbook, or the like. Connected device 1140 represents a device with a mobile device screen 1145 (e.g., a small size screen). For example, connected device 1140 could be a mobile phone, smart phone, personal digital assistant, tablet computer, and the like. Connected device 1150 represents a device with a large screen 1155. For example, connected device 1150 could be a television screen (e.g., a smart television) or another device connected to a television (e.g., a set-top box or gaming console) or the like. One or more of the connected devices 1130, 1140, 1150 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1100. For example, the cloud 1110 can provide services for one or more computers (e.g., server computers) without displays.

Services can be provided by the cloud 1110 through service providers 1120, or through other providers of online services (not depicted). For example, cloud services can be customized to the screen size, display capability, and/or touchscreen capability of a particular connected device (e.g., connected devices 1130, 1140, 1150).

In example environment 1100, the cloud 1110 provides the technologies and solutions described herein to the various connected devices 1130, 1140, 1150 using, at least in part, the service providers 1120. For example, the service providers 1120 can provide a centralized solution for various cloud-based services. The service providers 1120 can manage service subscriptions for users and/or devices (e.g., for the connected devices 1130, 1140, 1150 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 9, computer-readable storage media include memory 920 and 925, and storage 940. The term computer-readable storage media does not include signals and carrier waves (i.e., non-transitory). In addition, the term computer-readable storage media does not include communication connections, such as 970.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example Embodiments

Any of the following example embodiments can be implemented.

Example 1. One or more computer-readable media having encoded thereon computer-executable instructions for causing one or more processors, when programmed thereby, to perform operations comprising: receiving text-based content comprising a plurality of characters; generating a plurality of character category sequences for the text-based content using the plurality of characters, wherein each character category sequence, among the plurality of character category sequences, comprises multiple character category identifiers for multiple characters, respectively, of a different character sequence in the text-based content, and wherein each character category identifier, among the multiple character category identifiers, identifies one of a plurality of predefined character categories; calculating a frequency distribution of the plurality of character category sequences, wherein the frequency distribution represents relative frequencies of occurrence of unique character category sequences among a total number of the plurality of character category sequences; and classifying the text-based content based on the calculated frequency distribution of the plurality of character category sequences. The dimension of input to the machine learning model is reduced as compared with input based on a frequency distribution of character sequences for the text-based content, which can reduce computational complexity and reduce memory utilization for the classification operation, without adversely affecting the accuracy of the result of the classification.

Example 2. The one or more computer-readable media of example 1, wherein the classifying the text-based content uses a machine learning model, the machine learning model having been trained using a plurality of examples text-based content, each of which has a known classification, and wherein the classifying the text-based content comprises: providing, as input to the machine learning model, the calculated frequency distribution of the plurality of character category sequences; and determining, from output of the machine learning model, a classification of the text-based content.

Example 3. The one or more computer-readable media of example 2, wherein the machine learning model has been trained by training operations comprising, for each example of text-based content: generating a plurality of character category sequences for the example of text-based content using a plurality of characters in the example of text-based content and based on the plurality of predefined character categories; calculating a frequency distribution of the plurality of character category sequences for the example of text-based content; and providing, as input to the machine learning model, the calculated frequency distribution for the example of text-based content and the known classification of the example of text-based content, wherein the input to the machine learning model comprises a feature vector configured to receive the calculated frequency distribution of the example of text-based content.

Example 4. The one or more computer-readable media of example 3, wherein the feature vector has a dimension that is: equal to a count of unique character category sequences appearing at least once in the plurality of examples of text-based content; or equal to a count of possible unique character category sequences.

Example 5. The one or more computer-readable media of any one of examples 3-4, wherein the training operations further comprise reducing a dimension of the feature vector based on one or more metrics measuring performance of the machine learning model in classifying the plurality of examples of text-based content.

Example 6. The one or more computer-readable media of any one of examples 1-5, wherein the generating the plurality of character category sequences for the text-based content comprises: generating a plurality of character sequences for the text-based content using the plurality of characters; and converting the plurality of character sequences to the plurality of character category sequences based on the plurality of predefined character categories.

Example 7. The one or more computer-readable media of example 6, wherein the generating the plurality of character sequences comprises scanning from a first character to a last character of the text-based content so that the plurality of character sequences are sequentially ordered and so that adjacent character sequences, among the plurality of character sequences, are offset by one character.

Example 8. The one or more computer-readable media of example 6, wherein each character sequence of the plurality of character sequences has two or more characters.

Example 9. The one or more computer-readable media of any one of examples 6-8, wherein the converting the plurality of character sequences to the plurality of character category sequences comprises, for each of the plurality of character sequences, converting characters in the character sequence to respective character category identifiers in a corresponding character category sequence among the character category sequences.

Example 10. The one or more computer-readable media of any one of examples 1-5, wherein the generating the plurality of character category sequences for the text-based content comprises: generating a series of character category identifiers by converting respective characters of the text-based content into corresponding character category identifiers; and generating the plurality of character category sequences by scanning the series of character category identifiers from a first character category identifier to a last character category identifier of the series of character category identifiers, so that the plurality of character category sequences are sequentially ordered and so that adjacent character category sequences, among the plurality of character category sequences, are offset by one character category identifier.

Example 11. The one or more computer-readable media of any one of examples 1-5, wherein the generating the plurality of character category sequences for the text-based content comprises: scanning the plurality of characters of the text-based content on a character-by-character basis and, for each of a plurality of character sequences for the text-based content, determining a corresponding character category sequence among the plurality of character category sequences.

Example 12. The one or more computer-readable media of any one of examples 1-11, wherein the predefined character categories are Unicode categories.

Example 13. The one or more computer-readable media of any one of examples 1-12, wherein the operations further comprise: responsive to classifying the text-based content as unsolicited, restricting distribution of the text-based content or generating an alert for the text-based content.

Example 14. A computing device comprising: memory; one or more hardware processors coupled to the memory; and one or more computer readable storage media storing instructions that, when loaded into the memory, cause the one or more hardware processors to perform operations comprising: receiving text-based content comprising a plurality of characters; generating a plurality of character category sequences for the text-based content using the plurality of characters, wherein each character category sequence, among the plurality of character category sequences, comprises multiple character category identifiers for multiple characters, respectively, of a different character sequence in the text-based content, and wherein each character category identifier, among the multiple character category identifiers, identifies one of a plurality of predefined character categories; calculating a frequency distribution of the plurality of character category sequences, wherein the frequency distribution represents relative frequencies of occurrence of unique character category sequences among a total number of the plurality of character category sequences; and classifying the text-based content based on the calculated frequency distribution of the plurality of character category sequences. The dimension of input to the machine learning model is reduced as compared with input based on a frequency distribution of character sequences for the text-based content, which can reduce computational complexity and reduce memory utilization for the classification operation, without adversely affecting the accuracy of the result of the classification.

Example 15. The computing device of example 14, wherein the classifying the text-based content uses a machine learning model, the machine learning model having been trained using a plurality of examples of text-based content, each of which has a known classification, and wherein the classifying the text-based content comprises: providing, as input to the machine learning model, the calculated frequency distribution of the plurality of character category sequences; and determining, from output of the machine learning model, a classification of the text-based content.

Example 16. The computing device of example 15, wherein the machine learning model has been trained by training operations comprising, for each example of text-based content: generating a plurality of character category sequences for the example of text-based content using a plurality of characters in the example of text-based content and based on the plurality of predefined character categories; calculating a frequency distribution of the plurality of character category sequences for the example of text-based content; and providing, as input to the machine learning model, the calculated frequency distribution for the example of text-based content and the known classification of the example of text-based content, wherein the input of the machine learning model comprises a feature vector configured to receive the calculated frequency distribution of the example of text-based content.

Example 17. The computing device of example 16, wherein the training operations further comprise reducing a dimension of the feature vector based on one or more metrics measuring performance of the machine learning model in classifying the plurality of examples of text-based content.

Example 18. The computing device of any one of examples 14-17, wherein the operations further comprise: responsive to classifying the text-based content as unsolicited, restricting distribution of the text-based content or generating an alert for the text-based content.

Example 19. A computer-implemented method comprising: receiving a plurality of examples of text-based content, each of which has a known classification; and for each of the plurality of examples of text-based content: generating a plurality of character category sequences for the example of text-based content using a plurality of characters of the example of text-based content, wherein each character category sequence, among the plurality of character category sequences for the example of text-based content, comprises multiple character category identifiers for multiple characters, respectively, of a different character sequence in the example of text-based content, and wherein each character category identifier, among the multiple character category identifiers, identifies one of a plurality of predefined character categories; calculating a frequency distribution of the plurality of character category sequences for the example of text-based content, wherein the frequency distribution represents relative frequencies of occurrence of unique character category sequences, for the example of text-based content, among a total number of the plurality of character category sequences for the example of text-based content; and training a machine learning model based on the calculated frequency distribution for the example of text-based content and the known classification of the example of text-based content. The dimension of input to the machine learning model is reduced as compared with input based on a frequency distribution of character sequences for the example of text-based content, which can reduce computational complexity and reduce memory utilization for the training operation, without adversely affecting the result of the training.

Example 20. The computer-implemented method of example 19, further comprising: receiving new text-based content comprising a plurality of characters; generating a plurality of character category sequences for the new text-based content using the plurality of characters of the new text-based content, wherein each character category sequence, among the plurality of character category sequences for the new text-based content, comprises multiple character category identifiers for multiple characters, respectively, of a different character sequence in the new text-based content, and wherein each character category identifier, among the multiple character category identifiers for the new text-based content, identifies one of the plurality of predefined character categories; calculating a frequency distribution of the plurality of character category sequences for the new text-based content; providing, as input to the machine learning model, the calculated frequency distribution for the new text-based content; and classifying the new text-based content using the machine learning model.

EXAMPLE ALTERNATIVES

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. One or more non-transitory computer-readable media having encoded thereon computer-executable instructions for causing one or more processors, when programmed thereby, to perform operations comprising:
   receiving text-based content comprising a plurality of characters;
   generating a plurality of character category sequences for the text-based content using the plurality of characters, wherein each character category sequence, among the plurality of character category sequences, comprises multiple character category identifiers for multiple characters, respectively, of a different character sequence in the text-based content, and wherein each character category identifier, among the multiple character category identifiers, identifies one of a plurality of predefined character categories;
   calculating a frequency distribution of the plurality of character category sequences, wherein the frequency distribution represents relative frequencies of occurrence of unique character category sequences among a total number of the plurality of character category sequences; and
   classifying, using a machine learning model, the text-based content into one of multiple classes based on the calculated frequency distribution of the plurality of character category sequences, wherein a total number of the plurality of predefined character categories is smaller than a total number of possible unique characters such that dimension of input to the machine learning model is reduced as compared with input based on a frequency distribution of character sequences for the text-based content.

2. The one or more non-transitory computer-readable media of claim 1, wherein the machine learning model has been trained using a plurality of examples of text-based content, each of which has a known classification, and wherein the classifying the text-based content comprises:
   providing, as input to the machine learning model, the calculated frequency distribution of the plurality of character category sequences; and
   determining, from output of the machine learning model, a classification of the text-based content.

3. The one or more non-transitory computer-readable media of claim 2, wherein the machine learning model has been trained by training operations comprising, for each example of the plurality of examples of text-based content:
   generating a plurality of character category sequences for the example of text-based content using a plurality of characters in the example of text-based content and based on the plurality of predefined character categories;

calculating a frequency distribution of the plurality of character category sequences for the example of text-based content; and providing, as input to the machine learning model, the calculated frequency distribution for the example of text-based content and the known classification of the example of text-based content, wherein the input to the machine learning model comprises a feature vector configured to receive the calculated frequency distribution of the example of text-based content.

4. The one or more non-transitory computer-readable media of claim 3, wherein the feature vector has a dimension that is:

equal to a count of unique character category sequences appearing at least once in the plurality of examples of text-based content; or equal to a count of possible unique character category sequences.

5. The one or more non-transitory computer-readable media of claim 3, wherein the training operations further comprise reducing a dimension of the feature vector based on one or more metrics measuring performance of the machine learning model in classifying the plurality of examples of text-based content.

6. The one or more non-transitory computer-readable media of claim 1, wherein the generating the plurality of character category sequences for the text-based content comprises:

generating a plurality of character sequences for the text-based content using the plurality of characters; and converting the plurality of character sequences to the plurality of character category sequences based on the plurality of predefined character categories.

7. The one or more non-transitory computer-readable media of claim 6, wherein the generating the plurality of character sequences comprises scanning from a first character to a last character of the text-based content so that the plurality of character sequences are sequentially ordered and so that adjacent character sequences, among the plurality of character sequences, are offset by one character.

8. The one or more non-transitory computer-readable media of claim 6, wherein each character sequence of the plurality of character sequences has two or more characters.

9. The one or more non-transitory computer-readable media of claim 6, wherein the converting the plurality of character sequences to the plurality of character category sequences comprises, for each of the plurality of character sequences, converting characters in the character sequence to respective character category identifiers in a corresponding character category sequence among the character category sequences.

10. The one or more non-transitory computer-readable media of claim 1, wherein the generating the plurality of character category sequences for the text-based content comprises:

generating a series of character category identifiers by converting respective characters of the text-based content into corresponding character category identifiers; and generating the plurality of character category sequences by scanning the series of character category identifiers from a first character category identifier to a last character category identifier of the series of character category identifiers, so that the plurality of character category sequences are sequentially ordered and so that adjacent character category sequences, among the plurality of character category sequences, are offset by one character category identifier.

11. The one or more non-transitory computer-readable media of claim 1, wherein the generating the plurality of character category sequences for the text-based content comprises:

scanning the plurality of characters of the text-based content on a character-by-character basis and, for each of a plurality of character sequences for the text-based content, determining a corresponding character category sequence among the plurality of character category sequences.

12. The one or more non-transitory computer-readable media of claim 1, wherein the predefined character categories are Unicode categories.

13. The one or more non-transitory computer-readable media of claim 1, wherein the operations further comprise:

responsive to classifying the text-based content as unsolicited, restricting distribution of the text-based content;

responsive to classifying the text-based content as unsolicited, generating an alert for the text-based content; or responsive to classifying the text-based content as normal, permitting the distribution of the text-based content.

14. A computing device comprising:

memory;

one or more hardware processors coupled to the memory; and one or more non-transitory computer readable storage media storing instructions that, when loaded into the memory, cause the one or more hardware processors to perform operations comprising:

receiving text-based content comprising a plurality of characters;

generating a plurality of character category sequences for the text-based content using the plurality of characters, wherein each character category sequence, among the plurality of character category sequences, comprises multiple character category identifiers for multiple characters, respectively, of a different character sequence in the text-based content, and wherein each character category identifier, among the multiple character category identifiers, identifies one of a plurality of predefined character categories;

calculating a frequency distribution of the plurality of character category sequences, wherein the frequency distribution represents relative frequencies of occurrence of unique character category sequences among a total number of the plurality of character category sequences; and classifying, using a machine learning model, the text-based content into one of multiple classes based on the calculated frequency distribution of the plurality of character category sequences, wherein a total number of the plurality of predefined character categories is smaller than a total number of possible unique characters such that dimension of input to the machine learning model is reduced as compared with input based on a frequency distribution of character sequences for the text-based content.

15. The computing device of claim 14, wherein the machine learning model has been trained using a plurality of examples of text-based content, each of which has a known classification, and wherein the classifying the text-based content comprises:

providing, as input to the machine learning model, the calculated frequency distribution of the plurality of character category sequences; and determining, from output of the machine learning model, a classification of the text-based content.

16. The computing device of claim 15, wherein the machine learning model has been trained by training operations comprising, for each example of the plurality of examples of text-based content:

generating a plurality of character category sequences for the example of text-based content using a plurality of characters in the example of text-based content and based on the plurality of predefined character categories;

calculating a frequency distribution of the plurality of character category sequences for the example of text-based content; and providing, as input to the machine learning model, the calculated frequency distribution for the example of text-based content and the known classification of the example of text-based content, wherein the input of the machine learning model comprises a feature vector configured to receive the calculated frequency distribution of the example of text-based content.

17. The computing device of claim 16, wherein the training operations further comprise reducing a dimension of the feature vector based on one or more metrics measuring performance of the machine learning model in classifying the plurality of examples of text-based content.

18. The computing device of claim 14, wherein the operations further comprise:

responsive to classifying the text-based content as unsolicited, restricting distribution of the text-based content;

responsive to classifying the text-based content as unsolicited, generating an alert for the text-based content; or responsive to classifying the text-based content as normal, permitting the distribution of the text-based content.

19. A computer-implemented method of training a machine learning model for improved classification of text-based content, the method comprising:

receiving a plurality of examples of text-based content, each of which has a known classification; and for each of the plurality of examples of text-based content:

generating a plurality of character category sequences for the example of text-based content using a plurality of characters of the example of text-based content, wherein each character category sequence, among the plurality of character category sequences for the example of text-based content, comprises multiple character category identifiers for multiple characters, respectively, of a different character sequence in the example of text-based content, and wherein each character category identifier, among the multiple character category identifiers, identifies one of a plurality of predefined character categories;

calculating a frequency distribution of the plurality of character category sequences for the example of text-based content, wherein the frequency distribution represents relative frequencies of occurrence of unique character category sequences, for the example of text-based content, among a total number of the plurality of character category sequences for the example of text-based content; and training a machine learning model based on the calculated frequency distribution of the plurality of character category sequences for the example of text-based content and the known classification of the example of text-based content, wherein a total number of the plurality of predefined character categories is smaller than a total number of possible unique characters such that dimension of input to the machine learning model is reduced as compared with input based on a frequency distribution of character sequences for the example of text-based content.

20. The computer-implemented method of claim 19, further comprising:

receiving new text-based content comprising a plurality of characters;

generating a plurality of character category sequences for the new text-based content using the plurality of characters of the new text-based content, wherein each character category sequence, among the plurality of character category sequences for the new text-based content, comprises multiple character category identifiers for multiple characters, respectively, of a different character sequence in the new text-based content, and wherein each character category identifier, among the multiple character category identifiers for the new text-based content, identifies one of the plurality of predefined character categories;

calculating a frequency distribution of the plurality of character category sequences for the new text-based content;

providing, as input to the machine learning model, the calculated frequency distribution for the new text-based content; and classifying the new text-based content using the machine learning model.

* * * * *